Patented July 11, 1933

1,917,286

UNITED STATES PATENT OFFICE

ROGER ADAMS, OF URBANA, ILLINOIS, EARL HANFORD JOHNSON, OF GREEN BAY, AND VIKTOR M. WEINMAYR, OF MILWAUKEE, WISCONSIN, ASSIGNORS TO E. I. DU PONT DE NEMOURS & COMPANY, OF WILMINGTON, DELAWARE, A CORPORATION OF DELAWARE

NITRO DERIVATIVE OF α-NAPHTHOYL-O-BENZOIC ACID

No Drawing.    Application filed March 16, 1932. Serial No. 599,337.

This invention relates to novel intermediates for dyestuffs. More particularly, this invention deals with nitro-derivatives of alpha-naphthoyl-o-benzoic acid and a process for preparing the same.

In copending application Ser. No. 599,336 we have disclosed the novel compounds, 5'-halogen-1'-naphthoyl-2-benzoic acid. These may be prepared by reacting with halogen upon alpha-naphthoyl-o-benzoic acid in acetic acid solution, until one molecular weight of halogen has been consumed.

We have now found that these compounds may be nitrated under various conditions to produce a mononitro or dinitro derivative of alpha-naphthoyl-o-benzoic acid. In the first case, that is, under milder conditions of nitration, the nitro group enters the 8' position and produces 8'-nitro-5'-halogen-1'-naphthoyl-2-benzoic acid. Under more drastic conditions, for instance, when using larger quantities of nitric acid, the 5'-halogen atom is eliminated, producing 5',8'-dinitro-1'-naphthoyl-2-benzoic acid.

The novel products are useful as intermediates for other organic compounds useful in the dyestuff art.

It is, accordingly, an object of this invention to produce novel intermediates for dyestuffs having the following general formula:

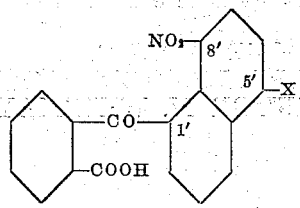

wherein X stands for a nitro group or a halogen atom.

Without limiting our invention to any particular procedure, the following examples will serve to illustrate our preferred mode of operation. Parts given are parts by weight.

*Example 1.—8'-nitro-5'-bromo-1'-naphthoyl-2-benzoic acid*

97 parts of 5'-bromo-1'-naphthoyl-2-benzoic acid are dissolved in 550 parts of 100% sulfuric acid at 10° C. and nitrated under agitation with 90 parts of mixed acid containing 21% nitric acid and 69% sulfuric acid at 5 to 10° C. After stirring for one hour at this temperature, a test shows no free nitric acid. The mass is diluted with 2000 parts of ice water; the nitro body is filtered and washed acid free. The yield is 108 parts, which is substantially equal to theory. When repeatedly recrystallized from hot nitrobenzene, a product is obtained having a melting point of 230–232° C. by the capillary tube method (when heated up from a cold bath). This product analyzes 1 atom of bromine per molecule.

When reduced with iron and acid, this product yields, not the free amine, but a compound which appears to be a pyrrole of the following formula:

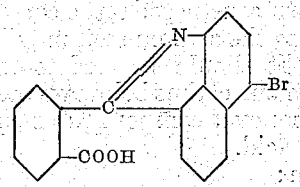

It follows, therefore, that the nitration product is 8'-nitro-5'-bromo-1'-naphthoyl-2-benzoic acid of the following formula:

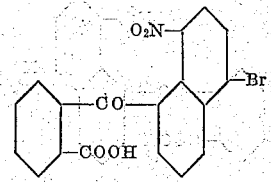

*Example 2.—8'-nitro-5'-chloro-1'-naphthoyl-2-benzoic acid*

109 parts of 5'-chlor-1'-naphthoyl-2-benzoic acid are dissolved in 600 parts of 100% sulfuric acid at 20–25° C., and nitrated at 0–5° C. with 110 parts of a nitrating mixture containing 20% nitric acid and 69% sulfuric acid. The finished nitration mass is poured into 4000 parts of ice and water, filtered and washed acid free. The yield is about 126 parts of dry product, which is substantially equal to theory. On crystallization from chlor-benzene, a product having a melting point of 233–234° C. is obtained. It is most probably 8'-nitro-5'-chloro-1'-naphthoyl-2-benzoic acid.

Example 3.—5',8'-dinitro-1'-naphthoyl-2-benzoic acid

Into a solution of 30 parts of 5'-bromo-1'-naphthoyl-2-benzoic acid in 160 parts of acetic anhydride, are dropped in slowly, with stirring, 45 parts of concentrated nitric acid. The temperature of the reaction should preferably not be allowed to go above 30° C. After the nitric acid has all been added, the solution is stirred for eight hours, during which time an appreciable quantity of the yellow 5',8'-dinitro-1'-naphthoyl-2-benzoic acid precipitates, which is then filtered. The acetic anhydride filtrate is poured into a large volume of water and allowed to stand over night to decompose the acetic anhydride. A yellow precipitate is here produced, which is filtered and added to the preceding filter cake. The joint filter cake is then crystallized twice from boiling toluene. If heated rapidly it melts sharply with decomposition at 262–263° C. Analysis shows it to be most probably 5',8'-dinitro-1'-naphthoyl-2-benzoic acid.

It will be understood that many variations and modifications are possible in our preferred procedure without departing from the spirit of this invention.

In the above examples the product was isolated as free acid. By neutralization, for instance with caustic soda, the corresponding salts, such as the sodium salt, may be readily obtained. It should be understood, therefore, that in our claims below we consider the salts of our novel compounds as equivalents of the free acid.

We claim:

1. A nitro derivative of alpha-naphthoyl-o-benzoic acid possessing the following general formula:

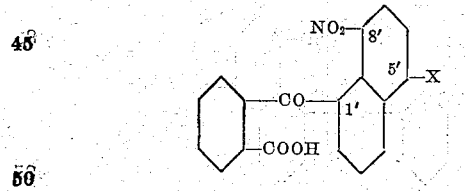

wherein X stands for halogen or the nitro group.

2. 5',8' - dinitro-1'- naphthoyl - 2 - benzoic acid.

3. 5'-halogen-8'-nitro-1'-naphthoyl-2-benzoic acid.

4. The process of producing a nitro derivative of alpha-naphthoyl-o-benzoic acid of the general formula:

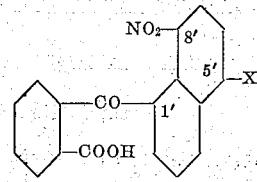

wherein X stands for halogen or the nitro group, which comprises reacting with nitric acid upon 5'-halogen-1'-naphthoyl-2-benzoic acid.

5. The process of producing 5',8'-dinitro-1'-naphthoyl-2-benzoic acid which comprises reacting with nitric acid upon 5'-halogen-1'-naphthoyl-2-benzoic acid, dissolved in acetic anhydride.

6. The process of producing 5'-halogen-8'-nitro-1'-naphthoyl-2-benzoic acid which comprises reacting with nitric acid upon 5'-halogen-1'-naphthoyl-2-benzoic acid, dissolved in sulfuric acid.

7. 5'-chloro-8'-nitro-1'-naphthoyl-2-benzoic acid.

8. 5'-bromo-8'-nitro-1'-naphthoyl-2-benzoic acid.

9. The process of producing 5'-chloro-8'-nitro-1'-naphthoyl-2-benzoic acid which comprises reacting with nitric acid upon 5'-chloro-1'-naphthoyl-2-benzoic acid, dissolved in sulfuric acid.

10. The process of producing 5'-bromo-8'-nitro-1'-naphthoyl-2-benzoic acid which comprises reacting with nitric acid upon 5'-bromo-1'-naphthoyl-2-benzoic acid, dissolved in sulfuric acid.

In testimony whereof we affix our signatures.

ROGER ADAMS.
EARL HANFORD JOHNSON.
VIKTOR M. WEINMAYR.